(12) United States Patent
Achour (10) Patent No.: US 11,474,230 B2
(45) Date of Patent: Oct. 18, 2022

(54) METHOD AND APPARATUS FOR NON-LINE-OF-SIGHT DETECTION AND CODED RADAR SIGNALS

(71) Applicant: Metawave Corporation, Palo Alto, CA (US)

(72) Inventor: Maha Achour, Encinitas, CA (US)

(73) Assignee: METAWAVE Corporation, Carlsbad, CA (US)

( * ) Notice: Subject to any disclaimer, the term of this patent is extended or adjusted under 35 U.S.C. 154(b) by 157 days.

(21) Appl. No.: 16/666,189

(22) Filed: Oct. 28, 2019

(65) Prior Publication Data

US 2020/0132826 A1    Apr. 30, 2020

Related U.S. Application Data

(60) Provisional application No. 62/751,005, filed on Oct. 26, 2018.

(51) Int. Cl.
  *G01S 13/538*    (2006.01)
  *G01S 13/536*    (2006.01)
  (Continued)

(52) U.S. Cl.
  CPC .......... *G01S 13/538* (2013.01); *G01S 13/536* (2013.01); *G01S 13/931* (2013.01)

(58) Field of Classification Search
  CPC ..... G01S 7/412; G01S 13/5246; G01S 13/526
  See application file for complete search history.

(56) References Cited

U.S. PATENT DOCUMENTS

| 3,382,496 | A | * | 5/1968 | Isao | ..................... G01S 13/526 342/160 |
| 3,992,710 | A | * | 11/1976 | Gabriele | ............. G01S 13/4445 342/90 |

(Continued)

FOREIGN PATENT DOCUMENTS

FR    2718250 A1 * 10/1995    ......... G01S 13/0218

OTHER PUBLICATIONS

T. Johansson, Å. Andersson, M. Gustafsson and S. Nilsson, "Positioning of moving non-line-of-sight targets behind a corner," 2016 European Radar Conference (EuRAD), 2016, pp. 181-184. (Year: 2016).*

(Continued)

*Primary Examiner* — Bernarr E Gregory
(74) *Attorney, Agent, or Firm* — Sandra Lynn Godsey (57) ABSTRACT

Radar systems and methods of using the same for detecting objects in non-line-of-sight ("NLOS") areas are disclosed. In various embodiments, the disclosed radar systems and methods use a clutter signature to determine a location and motion of an object. The disclosed radar systems may include a sounding signal module for transmitting a sounding signal to determine a clutter signature; a radar controller generating, controlling, and interpreting an object detection signal; a transmit antenna unit coupled to the radar controller, adapted to transmit the object detection signal; a receive antenna unit coupled to the radar controller, adapted to receive a return object detection signal; and/or a non-line of sight module coupled to the transmit antenna unit and the receive antenna unit adapted to determine a location of a detected object.

20 Claims, 11 Drawing Sheets

(51) Int. Cl.
  *G01S 13/931* (2020.01)
  *G01S 13/00* (2006.01)

(56) References Cited

U.S. PATENT DOCUMENTS

| | | | | |
|---|---|---|---|---|
| 4,001,820 | A * | 1/1977 | Rosenbaum | G01S 7/292 |
| | | | | 342/192 |
| 5,325,097 | A * | 6/1994 | Zhang | G01S 13/931 |
| | | | | 342/71 |
| 6,404,328 | B1 * | 6/2002 | Alland | G01S 13/931 |
| | | | | 340/435 |
| 6,809,681 | B1 * | 10/2004 | Niechayev | G01S 13/582 |
| | | | | 342/109 |
| 7,460,056 | B2 * | 12/2008 | Rivas | G01S 13/003 |
| | | | | 342/36 |
| 7,570,202 | B2 * | 8/2009 | Raney | G01S 13/882 |
| | | | | 342/188 |
| 9,146,317 | B2 * | 9/2015 | Pandharkar | G01S 17/58 |
| 10,205,457 | B1 | 2/2019 | Josefsberg et al. | |
| 2008/0111731 | A1 * | 5/2008 | Hubbard | G01S 13/5246 |
| | | | | 342/160 |
| 2009/0086189 | A1 * | 4/2009 | Drinkard | G01S 7/4813 |
| | | | | 356/5.01 |
| 2010/0207804 | A1 * | 8/2010 | Hayward | G01S 13/003 |
| | | | | 342/28 |
| 2016/0135694 | A1 | 5/2016 | van Dorp | |

OTHER PUBLICATIONS

"Rusk Multidimensional Channel Sounder"; published by Saab Medlav Technologies GmbH; Uttenreuth, Germany; copyright in the year 2015. (Year: 2015).*

Wu Chunming et al., "The Study of UWB Radar Life-Detection for Searching Human Subjects," 2012 International Conference on Future Electrical Power and Energy Systems, Information and Engineering College, Northeast Dianli University, Jilin, China, pp. 1028-1033, 2012.

L. Danielsson, "Tracking and Radar Sensor Modelling for Automotive Safety Systems," Thesis for the Degree of Doctor of Philosopie, Department of Signals and Systems, Signal Processing Group, Chalmers University of Technology, Goteborg, Sweden, pp. 1-102, 2010.

F. Bu et al., "Pedestrian Detection in Transit Bus Application: Sensing Technologies and Safety Solutions," IEEE Proceedings, Intelligent Vehicles Symposium, Las Vegas, NV, pp. 100-105, Jun. 2005.

S. Patole et al., "Automotive Radars: A Review of Signal Processing Techniques, Signal Processing for Smart Vehicle Technologies: Part 2," in IEEE Signal Processing Magazine, pp. 22-35, Mar. 2017.

"Adaptive Antennas for Wireless Communications," edited George V. Tsoulos, PA Consulting Group, IEEE Antennas & Society Sponsor, The Institue of Electrical and Electronics Engineers, Inc. New York, pp. 1-763, 2001.

S.-H. Jeong, et al., "A Multi-Beam and Multi-Range Radar With FMCW and Digital Beam Forming for Automotive Applications," Progress in Electromagnetics Research, vol. 124, pp. 285-299, 2012.

D. Kissinger, "Radar Fundamentals," in Millimeter-Wave Receiver Concepts for 77 GHz Automotive Radar in Silicon-Germanium Technology, SpringerBriefs in Electrical and Computer Engineering, pp. 9-19, 2012.

Mahmoud Khodjet-Kesba, "Automatic target classification based on radar backscattered ultra wide band signals," University Blaise Pacsal, pp. 1-161, May 2016.

M. Steinhauer et al., "Millimeter-Wave-Radar Sensor Based on a Transceiver Array for Automotive Applications," IEEE Transactions on Microwave Theory and Techniques, vol. 56, No. 2, pp. 1-9, Feb. 2008.

W. L. Melvin et al., "Principles of Modern Radar," vol. II: Advanced Techniques, SciTec Publishing, Edison, NJ, pp. 1-876, 2013.

W. L. Melvin et al., "Principles of Modern Radar," vol. III: Radar Applications, SciTec Publishing, Edison, NJ, pp. 1-796, 2014.

* cited by examiner

METHOD AND APPARATUS FOR NON-LINE-OF-SIGHT DETECTION AND CODED RADAR SIGNALS

CROSS REFERENCE TO RELATED APPLICATION

The present application claims priority to U.S. Provisional Patent Application Ser. No. 62/751,005, filed on Oct. 26, 2018, which is incorporated by reference in its entirety.

BACKGROUND

Autonomous vehicles and Automated Driver Assist Systems ("ADASs") are the next phase of transportation around the world. While the main goal of such systems is to improve safety both for the individual and for the roadways and cities, these systems rely on accurate, reliable systems in a variety of situations, as well as the control decisions thereof.

BRIEF DESCRIPTION OF THE DRAWINGS

The present application may be more fully appreciated in connection with the following detailed description taken in conjunction with the accompanying drawings, which may not be drawn to scale and in which like reference characters refer to like parts throughout, and in which.

DETAILED DESCRIPTION

Methods and apparatuses to enable reliable, accurate, and flexible object detection in a radar system, where such systems enable non-line-of-sight ("NLOS") detection capabilities, are disclosed. In communications and object detection applications, a signal is transmitted to communicate information or identify a location of an object. The transmission path from a transmitter to a receiver in a communication system, or from an object detection sensor to an object, has a field of view within which the transmissions are uninterrupted. This field of view, which comprises the total area that can be captured by a movable (e.g., scanning) radar system, is referred to as the line-of-sight ("LOS"); and the area outside of the LOS is referred to as the NLOS. Within the LOS, transmission signals travel directly to a receiver or to an object. For electromagnetic millimeter wavelength transmissions, an antenna transmits signals as a beamform that defines the LOS. In real world systems, there are often obstacles that obstruct the direct transmission, such as buildings, trees, and so forth. These obstructions may act as reflection or deflection points that change the direction of all or some of the transmission signal. A reflection or deflection may also be referred to as an "echo". Note that throughout this description, the term "reflection" (or "reflect") is used to refer to the change in direction of energy transmitted from an antenna or transmission source, and includes both reflections and deflections. The energy is reflected, or redirected, on interaction with an obstacle. The processes and examples are described herein with respect to an object detection sensor employing a radar sensor. However, these processes, methods, and apparatuses are applicable to other systems using transmissions for communication or object detection.

Figure 1A:
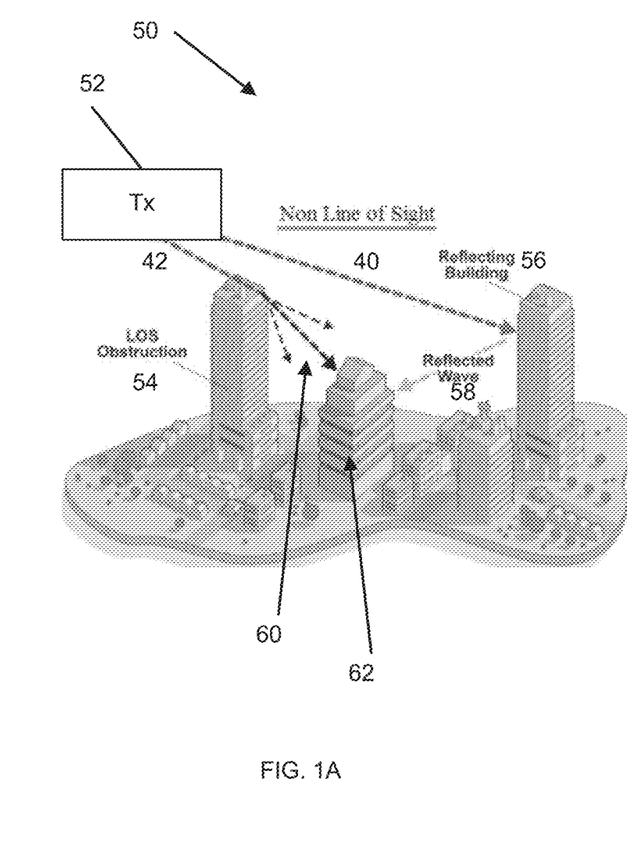
FIG. 1A illustrates a communication system having different transmission paths that reflect off of various obstructions.

FIG. 1A illustrates a communication system 50 having both LOS and NLOS transmission paths. A transmitter ("Tx") 52, which may be a transceiver, transmits signals 40 in a first direction. The signals 40 reflect off of reflecting building 56 to generate reflected waves 58, which are directed in a different direction and are received at building 62. Signals 42, transmitted in a second direction, have an obstruction within the LOS, which is LOS obstruction building 54. The signals 42 reflect off of LOS obstruction building 54 to generate reflected waves 60, which are directed in various different directions. Some of the reflected waves 60 are received at building 62. In this system, there may be receivers located in NLOS areas as the LOS transmissions are obstructed by buildings, and reflected waves may be directed into the NLOS areas.

Figure 1B:
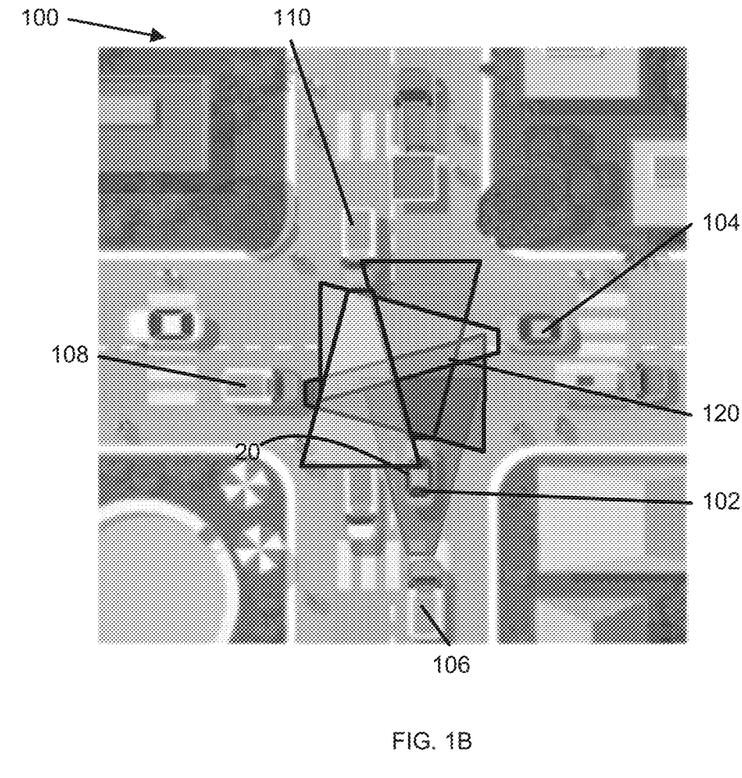
FIG. 1B illustrates a driving scenario with non-line of sight detection systems, according to various implementations of the subject technology.

FIG. 1B illustrates an environment 100 in which multiple vehicles are operating with object detection systems, such as for autonomous driving or for an Automated Driver Assistance System ("ADAS"). The environment 100 is a transportation intersection with activity in all directions. Any sensor in the vehicles that is detecting objects is moving with the vehicle in a dynamic environment. Object detection in the NLOS areas is thus a critical capability. Here, NLOS transmissions refer to radio transmissions, such as radar transmissions, that travel across a partially or fully obstructed path. Obstructions in the obstructed path are typically physical objects, such as buildings. There are many applications for the systems and methods disclosed herein, and some examples are illustrated in a radar system for driver assist and autonomous operation of a vehicle. This is not meant to be limiting, but rather is provided for clarity of understanding.

An object detection system in a vehicle includes a sensor that moves with the vehicle and, therefore, the sensor position and sensor field of view are in motion. Such sensors are tasked with understanding the environment within which they operate. There are a variety of sensors (and often a design incorporates multiple sensors) that may be employed including, but not limited to, a camera, radar, lidar, ultrasound, and others.

In object detection systems, when incorporating a radar modulation scheme, such as a frequency-modulated carrier-wave ("FMCW") scheme (e.g., using a sawtooth waveform), the difference between the transmit and receive signals provides range information and velocity. The velocity is deduced from the phase difference between the transmit and receive signals. The distance to an object, or the range, and the velocity are collated as range-Doppler information, or a mapping, to interpret the environment. The use of a FMCW scheme has many advantages in range-Doppler detection.

The disclosed systems and methods may be applied in a transportation system, such as in environment 100 of FIG. 1B. In this figure, there are multiple vehicles 102, 104, 106, 108, 110 traveling within the transportation environment 100, where at least some of the vehicles 102, 104, 106, 108, 110 have object detection radar systems. Vehicle 102 is illustrated to have an object detection radar system (e.g., Radar Sensing Unit ("RSU") 20) for both long-range and short-range detection. The RSU 20 is positioned on or within vehicle 102. Other radar systems may be employed by the vehicles 102, 104, 106, 108, 110 that may provide any number of range detection levels. Other vehicles illustrated in this figure also have radar systems, such as vehicles 104, 106, 108, 110. The radar beams radiated from these vehicles 104, 106, 108, 110 are provided in shadow, such as radar beam 120 from vehicle 102.

Figure 2:
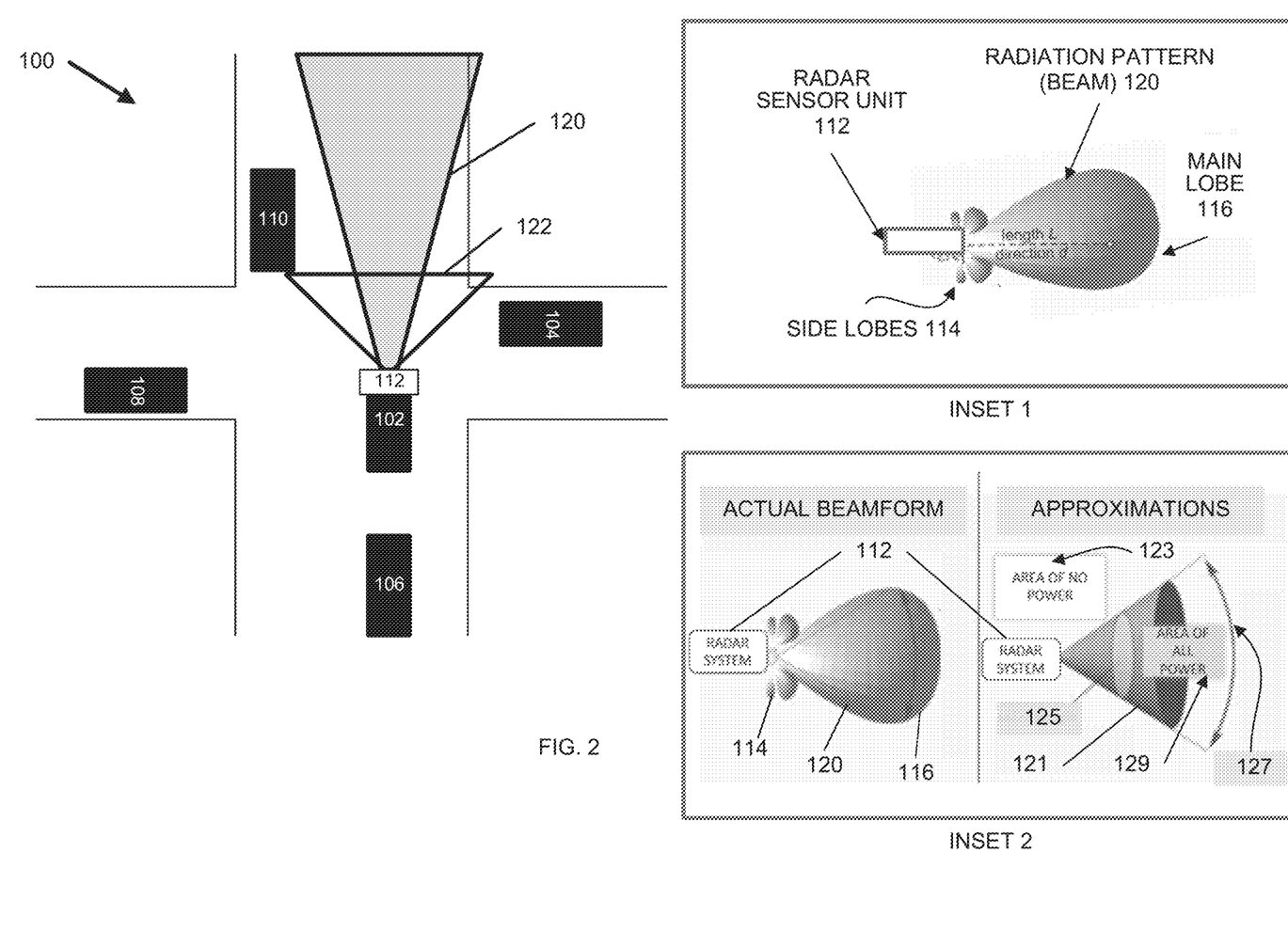
FIG. 2 illustrates operation of multiple radar detection systems, according to various implementations of the subject technology.

FIG. 2 also illustrates the environment 100, isolating vehicle 102, to illustrate the short-range radar beam 122 and the long-range radar beam 120 radiated from RSU 112 of vehicle 102. The position of vehicle 102 with respect to the other moving vehicles 104, 106, 108, 110, and with respect to the infrastructure is described. Objects, including other vehicles 104, 106, 108, 110 within the short and long-range beam areas, are detectable within the area of beams 120, 122. This includes reflections and multi-path transmissions that pass through these areas. For simplicity, the areas are drawn as two-dimensional ("2D") images. However, these beams 120, 122 are three-dimensional ("3D") spatial images, and they move as RSU 112 moves with the vehicle 102. Therefore, in that sense, these beams 120, 122 are four-dimensional ("4D"), including three spatial dimensions and time. An inset image, INSET 1, illustrates a radiation pattern, or beam 120, having a directivity in a direction d, and a length L indicating the length to a three decibel ("dB") intensity point. The ratio of the radiation intensity in any direction d to the intensity averaged over all directions is the directive gain of the antenna in that direction. The directive gain along the direction in which that quantity is maximized is known as the directivity of the antenna, and the directivity multiplied by the radiation efficiency is the power gain of the antenna, which is very often referred to as the gain ("G"). In the direction of the maximum radiated power density, there is G times more power than would have been obtained from an isotropic antenna. Consider that antennas radiate the power that is supplied. The higher the gain G of a directional antenna, the more narrowly focused is the energy radiated from it.

In the implementations and examples provided herein, there is an assumption made that there exists a mathematical relationship between the gain of an antenna and the specific dimensions of the focused beam. This assumption results in an approximation that all radiated energy of an antenna is uniformly distributed across a beam with some solid angle $\Omega_{beam}$, and that no energy is radiated elsewhere. In this case, the directivity of the antenna is equal to the ratio of the beam's solid angle $\Omega_{beam}$ to the total area of the unit sphere ($4\pi$), and the solid angle $\Omega_{beam}$ is inversely proportional to the directivity (e.g., refer to the insets, INSET 1 and 2, of FIG. 2). If the antenna has high directivity and radiates most of the received energy, then the gain and directivity are approximately the same, and the size of the beam is inversely proportional to the gain. The beam angle is roughly the square root of the solid angle $\Omega_{beam}$, when the beam is reasonably symmetric. It should be noted that, in most aspects, the terms "beam" and "beamform" may be used interchangeably.

Continuing with FIG. 2, INSET 1 illustrates an RSU 112 and a corresponding actual beamform, radiation pattern 120. The main lobe 116 of the radiation pattern 120 is directed in direction d. The radiation pattern also has side lobes 114, which are designed to be minimized so as not to act as interference and object detection misdirects.

INSET 2 of FIG. 2 illustrates an approximation of the actual beamform that enables calculations, simulations, analysis, and design of an antenna in a radar system, such as RSU 112. The approximation replaces the radiation pattern 120, including both the main lobe 116 and the side lobes 114, as radiation pattern 121. In this approximation, there is no power in area 123, and all of the power is present in the area 129, which is within the cone-shaped radiation pattern 121. The approximation is that all energy radiated by the antenna is uniformly distributed across radiation pattern 121 in a cone form and within the area of the solid angle $\Omega_{beam}$ 125, which is a measure of the field of view from the RSU 112. The radiation pattern 121 is approximated to be symmetric and, therefore, beam angle $\theta_{beam}$ 127 is approximately equal to the square root of the solid angle $\Omega_{beam}$ 125. For clarity, these 3D features are described by slices of the radiation pattern beamform in planes that pass through the symmetric axes of the beamform.

The RSU 112 of vehicle 102 may transmit radiation beamforms in a variety of directions. In some examples, the RSU 112 steers the beam, thereby changing the directivity of the beamform. When a beam is directed toward an object or obstruction, there is a reflection or redirection of the energy of the beamform, which sends energy in directions and in areas that may be NLOS areas.

Figure 3:
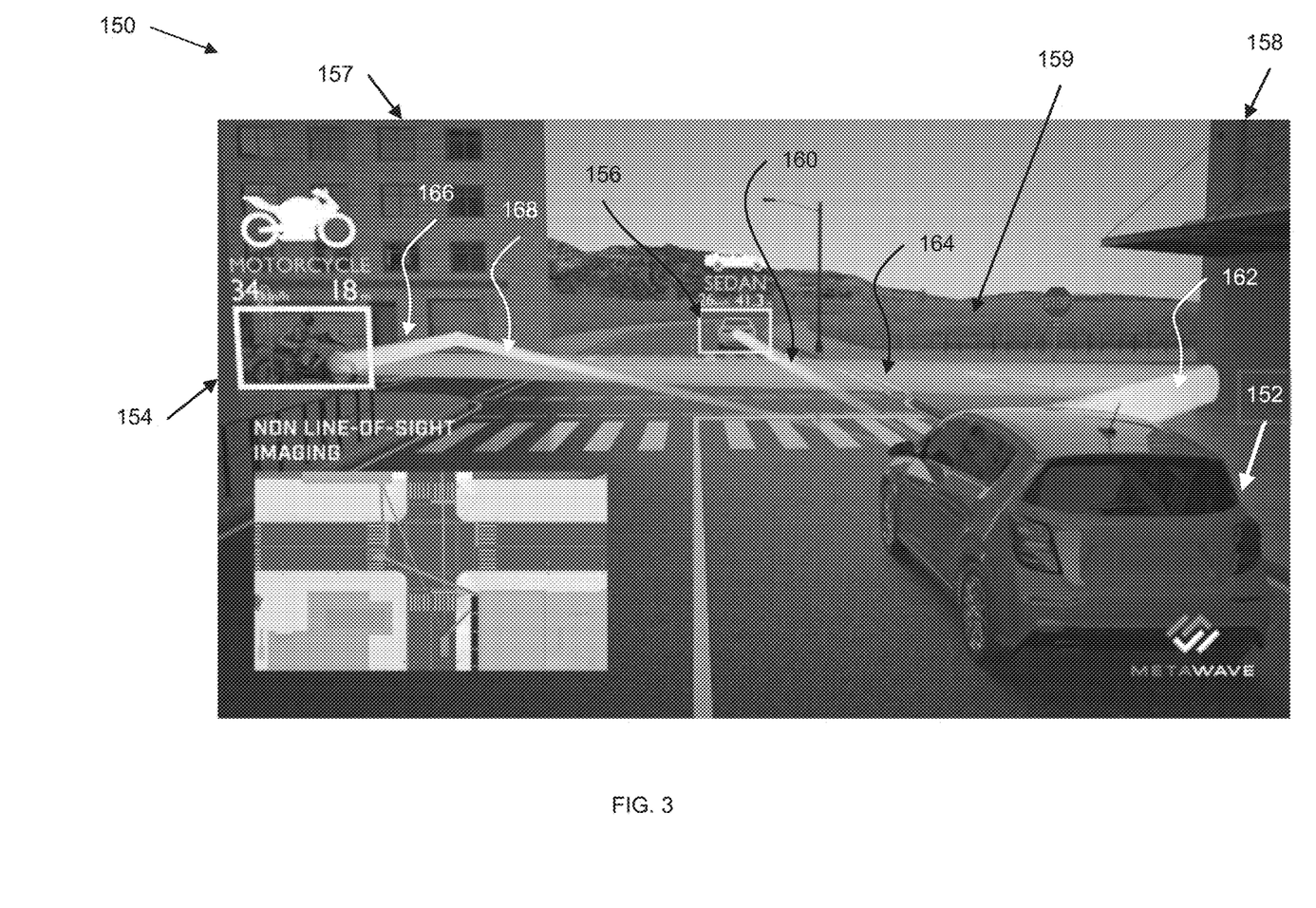
FIG. 3 illustrates operation of a radar detection system for a vehicle, according to various implementations of the subject technology.

FIG. 3 illustrates a driving environment 150 having a vehicle 152 traveling in a forward direction through an intersection. On two corners of this figure are buildings 157 and 158, and close to the roadway and on another corner is a field 159. As the vehicle 152 drives through the environment 150, radar signals are sent, and echoes are received. The vehicle 152 includes a radar unit, similar to RSU 112, that has the capability to generate and transmit radar signals that enable the vehicle 152 to comprehend the environment, identify obstacles, make determinations of actions, and so forth. As the vehicle 152 travels, a vehicle 156 is detected in the LOS area of vehicle 152. Vehicle 156 is a car moving in the same direction as vehicle 152. Radar beam transmission 160, from vehicle 152, is radiated in that same direction, is reflected by vehicle 156, and is received back at vehicle 152, thereby enabling range and velocity information calculations for vehicle 156. In this scenario, vehicle 156 will be referred to as a "target".

In the examples provided herein, the transmissions (i.e. transmission signals) are illustrated as individual transmission paths. However, it is understood that the transmission from vehicle 152 is a radiation beam that covers a detection area that includes the objects detected. Portions of the energy of the radiation beam reflect on interaction with an obstacle. The inset illustration of FIG. 3 is further detailed in FIG. 4, which identifies the transmission paths (e.g., transmissions 160, 162, 164, 166, 168). A short-range detection area in FIG. 3 is an area covered by both the transmission radiation beam (e.g., transmission 160) and the area within which energy is detected. Reflection points within the short-range detection area are illustrated as building 158, motorcycle 154, and building 157. In this example, one of the reflection points is a motorcycle 154, which may be in motion or stationary, and other reflection points are illustrated as stationary buildings, which have a zero velocity. The direct LOS transmission path (i.e. transmission 160) radiated from vehicle 152 is unobstructed to detect objects in that direction.

Continuing with FIG. 3, transmissions radiated from vehicle 152 also reflect off obstructions towards the NLOS areas of vehicle 152. Transmission 162, radiated from vehicle 152, travels to building 158, and reflects off building 158 to generate transmission 164. Transmission 164 travels to a NLOS vehicle, motorcycle 154. Motorcycle 154 is an NLOS obstruction because it is located within an NLOS area of vehicle 152. Transmission 164 reflects off of building 157 to generate transmission 168, which returns to vehicle 152. The RSU 112 detects transmission 168, and determines that transmission 168 is a response from transmission 162 radiated from vehicle 152. The RSU 112 uses transmission 168 to calculate range and velocity of the object (e.g., motorcycle 154). The inset of FIG. 3 provides a clear top view of the transmission paths and reflections. In this way, objects in the NLOS areas of vehicle 152 may be detected by the RSU 112.

Figure 4:
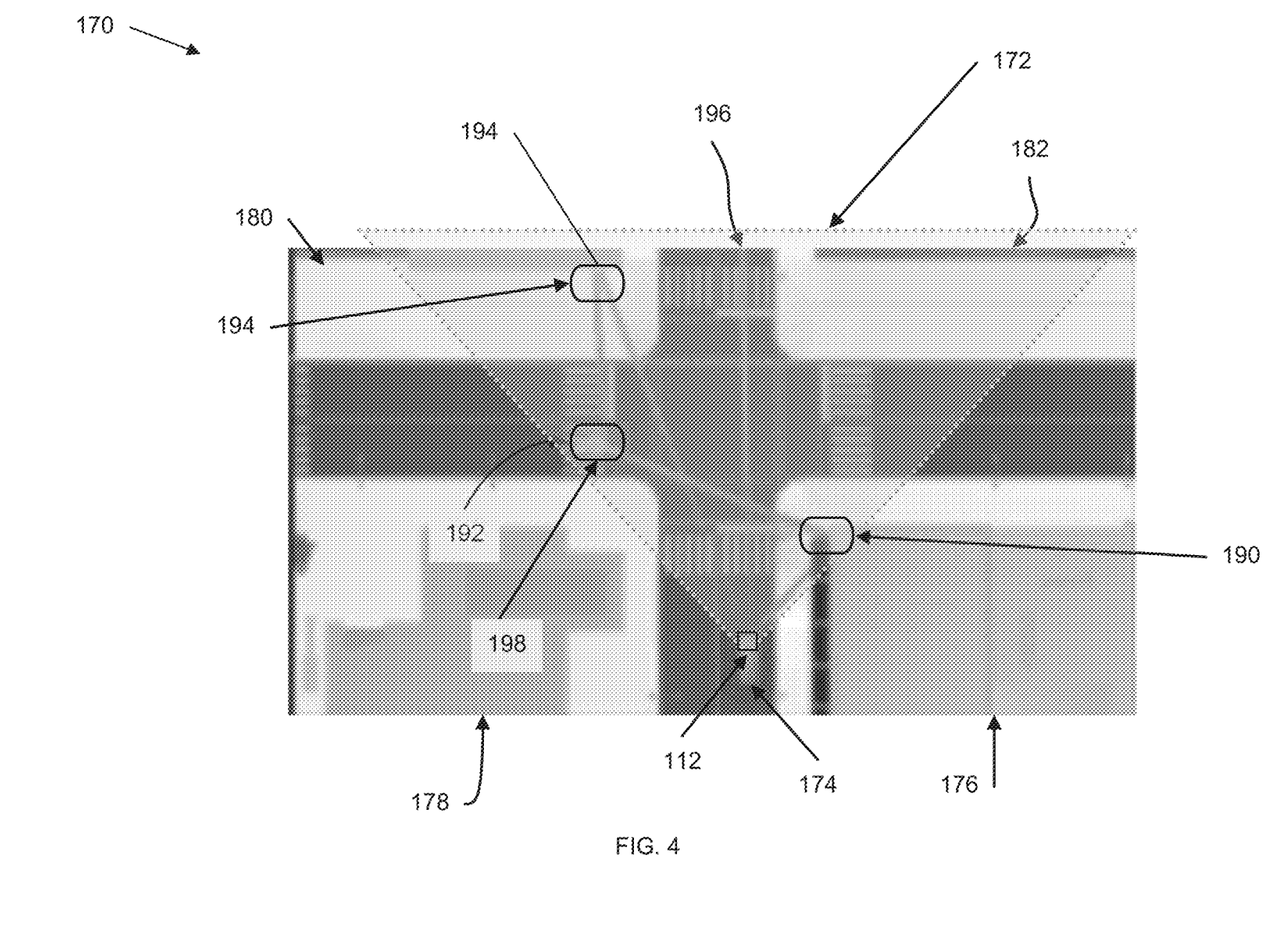
FIG. 4 illustrates a range of a vehicle radar unit, according to various implementations of the subject technology.

FIG. 4 illustrates the inset of FIG. 3, where road environment 170 and the short-range area 172 of RSU 112 within which vehicle 174 is able to detect objects. The range over which the radar transmissions from RSU 112 is possible is indicated by short-range area 172. The environment 170 includes obstacles that may interfere with the radar transmissions of RSU 112 of vehicle 174. These obstacles include buildings 176, 178, 180, 182, and vehicle 198. Reflection points 190, 192, and 194 are also identified in the figure. The reflection points 190, 192, 194 are identified where the radiation beams experience an abrupt disruption. Transmission paths are changed upon reflection at each of these reflection points 190, 192, 194. The range of the radar, the specific beamform, and the type of beam steering may take a variety of formats. Radar units, similar to RSU 112, may be in other vehicles, such as within vehicle 196. These radar units may also have other range capabilities, such as mid-range and/or long-range capabilities. The ability to detect objects at different distances enables accurate and complete detection.

Figure 5:
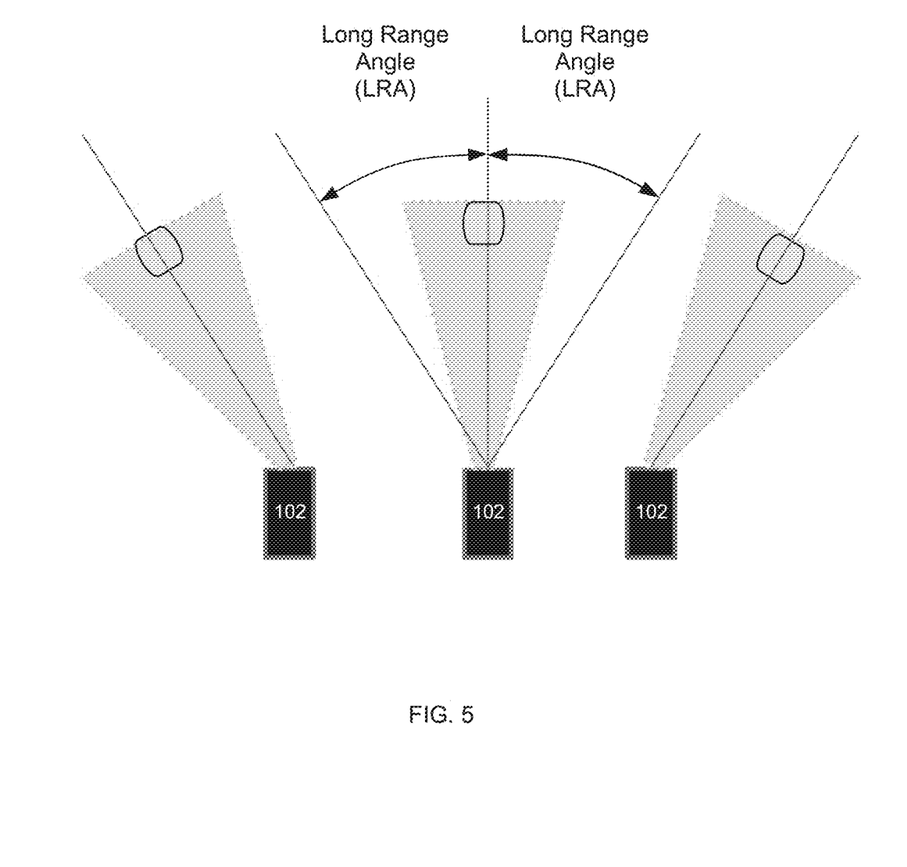
FIG. 5 illustrates multiple steered transmission beam angles in a radar detection system, according to various implementations of the subject technology.
Figure 6A:
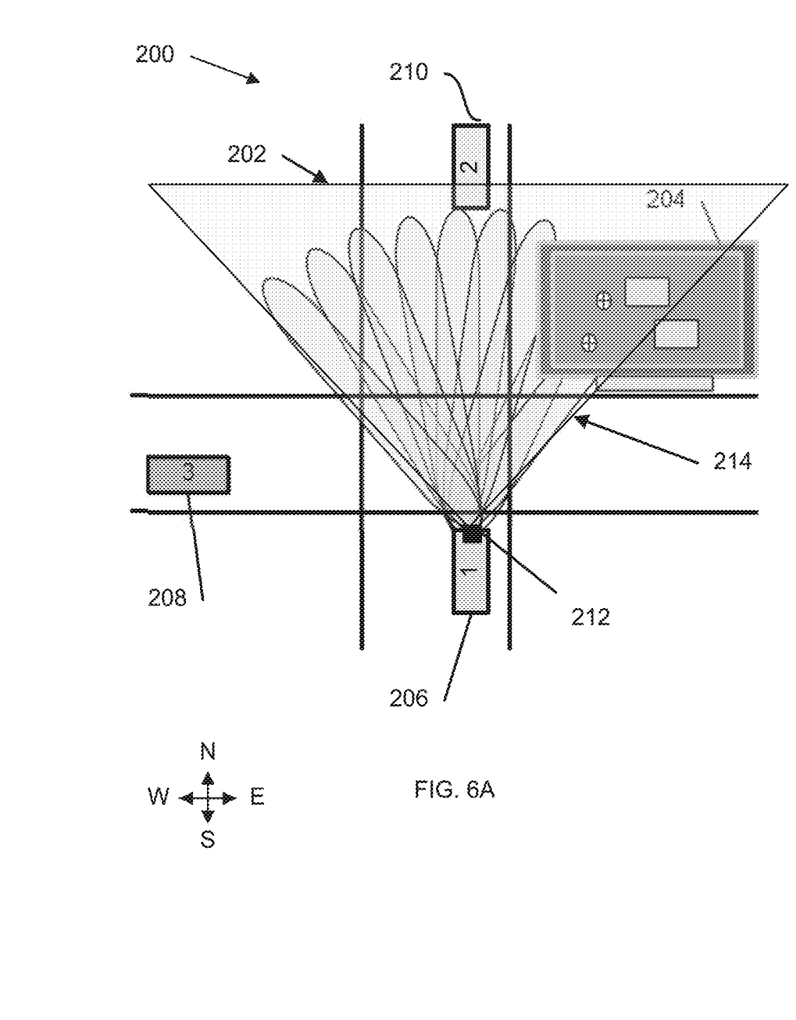
FIG. 6A illustrates operation of an object detection system, where a beam is scanned over time, according to various implementations of the subject technology.
Figure 6B:
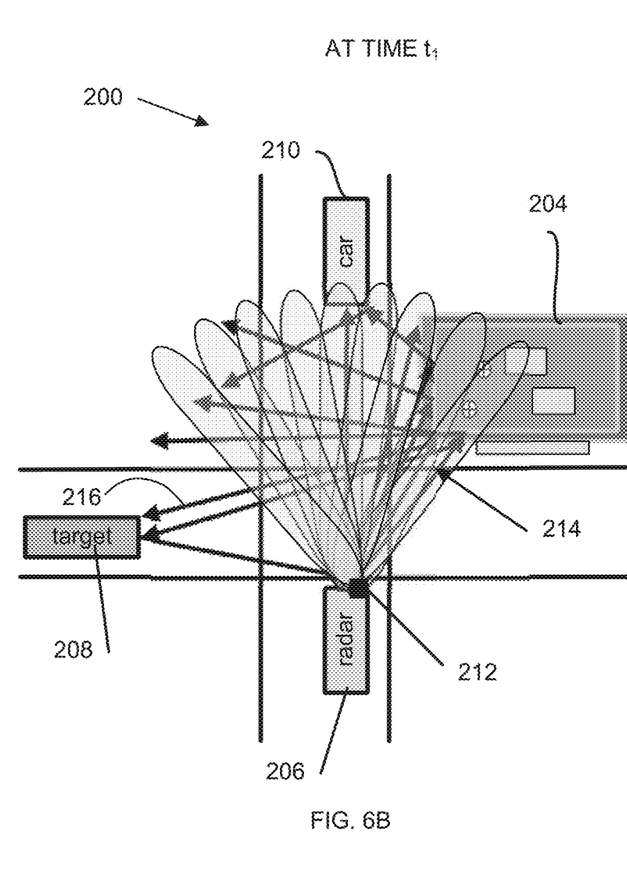
FIG. 6B illustrates operation of an object detection system, where the beam scanned over time is reflected off of obstructions, according to various implementations of the subject technology.

The RSU 112, of the present examples, provides a steerable beam, as is illustrated in FIG. 5, where some of the beams that are generated from RSU 112 of vehicle 102 of FIG. 2 are illustrated. As shown in FIG. 5, the possible angular (scanning) range of the beams is twice the long-range angle ("LRA"). FIG. 6A illustrates, in time lapse format, a single beam transmitted at distinct times in different directions (i.e. the scanning of a single beam) so as to cover the entire short-range area 202 over a period of time. In particular, the environment 200 of FIG. 6A has vehicle 206 with a RSU 212 that steers, or sweeps, the transmission beam to cover the short-range area 202 by beams 214. As shown in FIG. 6B, the radar beams 214 interact with office building 204 and vehicle 210, which reflect the transmission beams 214 directed towards themselves. The various reflected beams are illustrated as transmission paths 216. When the surface of an obstacle (e.g., a building or vehicle) is uneven or irregular, there may also be scattering of reflections. A target vehicle 208 is located within the NLOS of the RSU 212. Some of the transmission paths result in detection of the target vehicle 208, and others go in different directions until there is no energy left. These reflections may be used to identify objects in a NLOS area of vehicle 206. The beams 214 generated within the LRA of RSU 212 are illustrated.

The actual size of a radiation beam may be fine, referred to as a pencil beam, and may be adjusted by a radar controller (e.g., RSU 212) in response to road conditions, objects detected, and operation of the vehicle. In environment 200, the vehicle 206 is moving in a north direction, as is vehicle 210. Vehicle 208 is moving in an east direction. Vehicle 206 comprises RSU 212, which is transmitting beams 214 over a short-range area 202. The individual beams 214 are used to scan the short-range area 202 for objects, including vehicles and buildings, such as building 204. There may be any number of reflection points where these interactions with objects cause abrupt discontinuations in the radiation pattern and transmissions.

In some examples, the transmissions from RSU 212 are provided in a FMCW modulation scheme, thereby enabling detection of objects' location and movement. This information is in the form of range and velocity coordinated data, referred to as a Range-Doppler Map. This is discussed hereinbelow in more detail. FIG. 6B illustrates the system at time $t_1$ with the reflections 216, of the transmission beams 214, illustrated by directional arrows. Upon contact with obstructions, the transmission beams 214 may reflect, deflect, scatter and so forth. There are also other signals transmitted from other vehicles and sensors, which may cause interference and clutter at the RSU 212. The resultant reflections may also be received at the RSU 212, where the received signal provides information as to the range by measure of return time. When the return time of a received signal is outside of an expected return time range (e.g., when the return time is greater than a maximum return time delay ("$t_{max}$")), the RSU 212 will determine that the received signal is a reflection. For example, an RSU 112 expects a maximum return time delay of $t_{max}=2*d_{SR}/c$, where c is the speed of light and $d_{SR}$ is the maximum distance from the vehicle 206 to the boundary of the short-range area 202, which is the capability of the RSU 212 for its radar transmissions. As such, when the return time is greater than $t_{max}$, this indicates to the RSU 212 that there is disruption in the direct path of the beam 214. From the return time, the phase difference of the return signal, and the angle of arrival, the RSU 212 is able to determine the location of objects in a NLOS area of vehicle 206.

Figure 7:
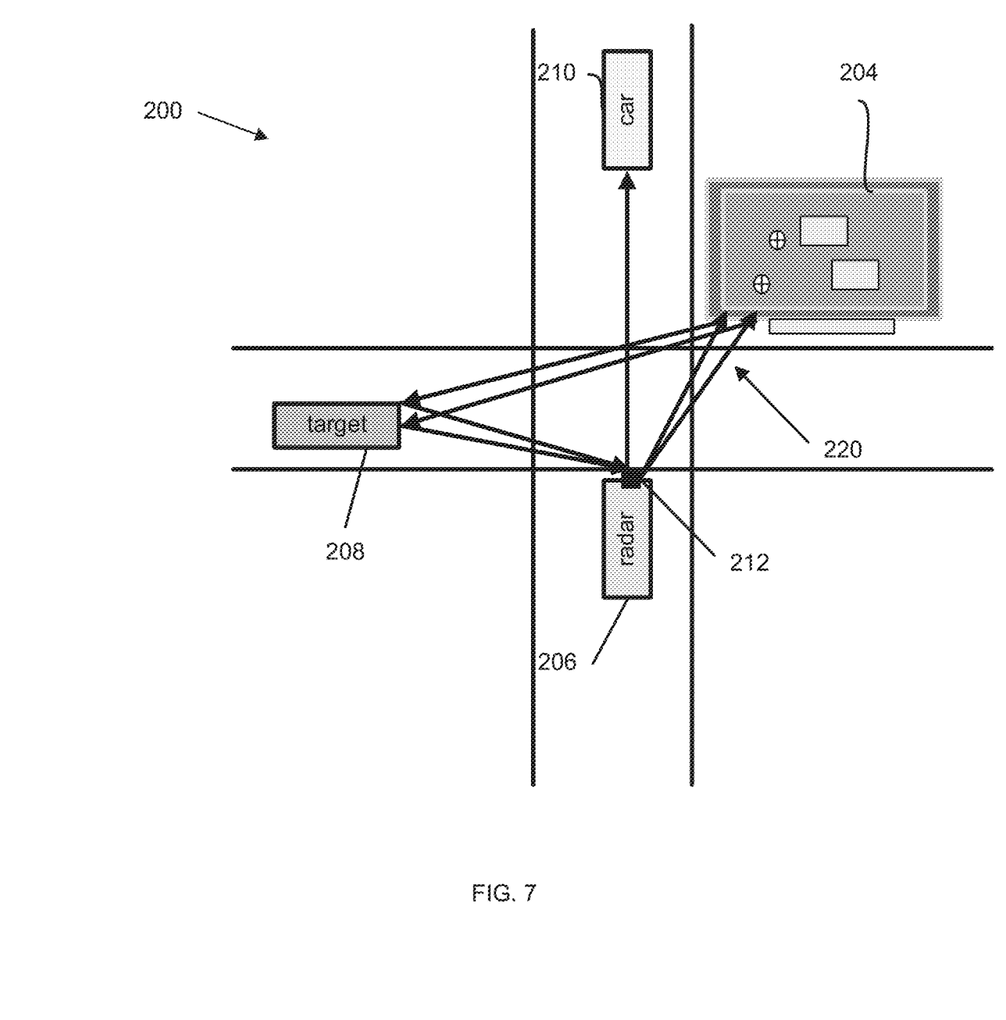
FIG. 7 illustrates detection of a NLOS target, according to various implementations of the subject technology.

FIG. 7 illustrates some of the possible reflections within environment 200 at time $t_1$. As indicated, there are several paths where reflections at building 204 have multiple hops, such as to reflect off target 208 in a NLOS area of vehicle 206. Note that a NLOS area may be any area outside the radar range 202 (refer to FIG. 6A). In FIG. 7, the reflections are multi-hop reflections, which enable NLOS detections. In this situation, the RSU 212 transmits signals 220 that are reflected off of building 204 in the direction of the target 208. The reflected signals hitting target 208 are then reflected back to the RSU 212. The RSU 212 is also able to detect the car 210 that is traveling in the same direction and the same lane as car 206. There may be any number of reflections, deflections (hops), within a given scenario.

Figure 8:
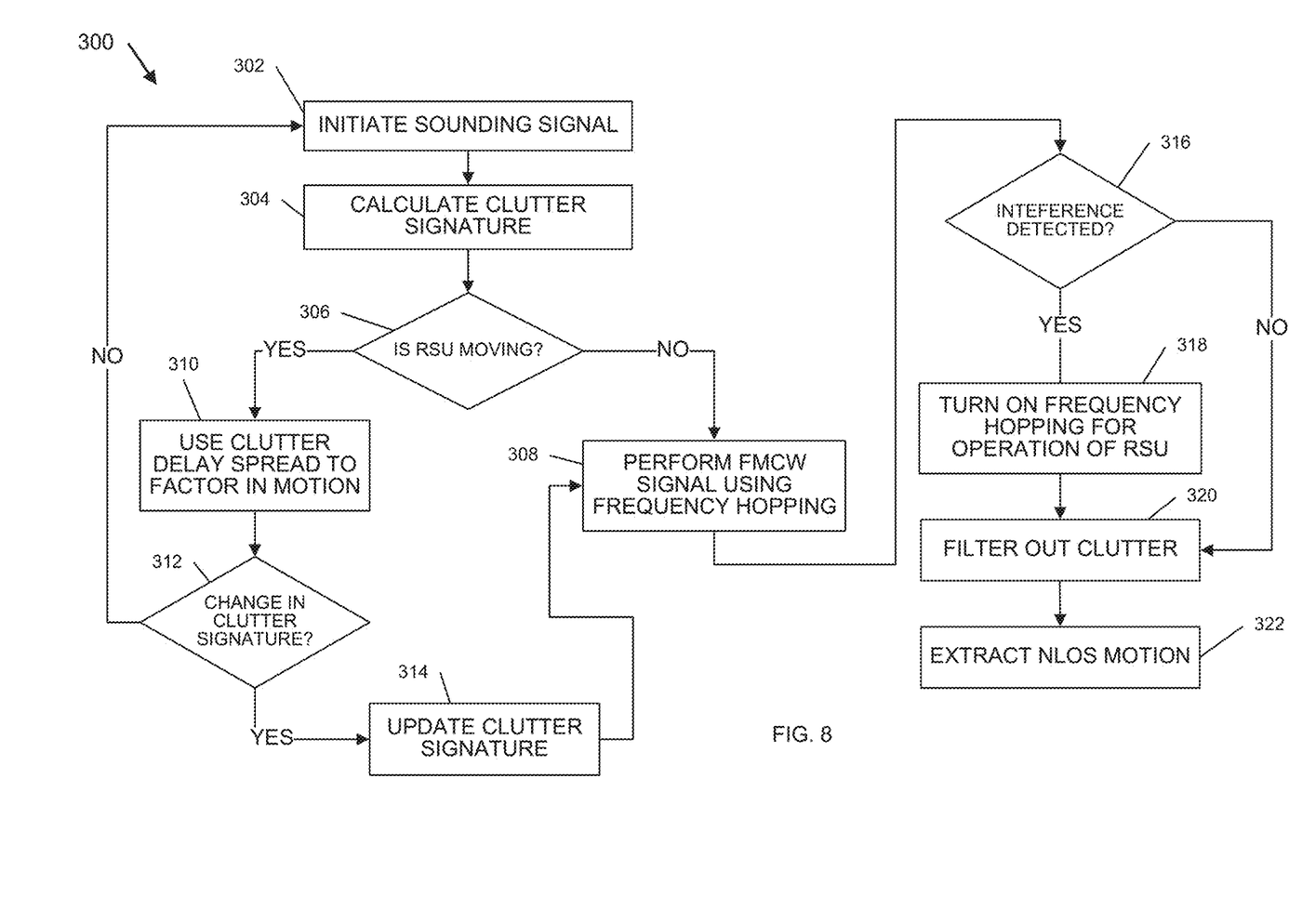
FIG. 8 is a flow diagram illustrating operation of an object detection system, according to various implementations of the subject technology.
Figure 9A:
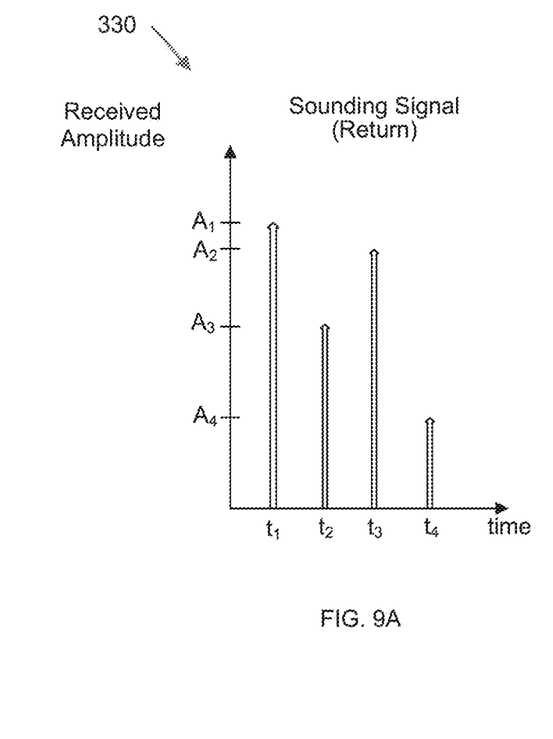
FIG. 9A illustrates a plot of an exemplary clutter signature employed by an object detection system, according to various implementations of the subject technology.

FIG. 8 illustrates a method 300 for object detection capable of detecting in NLOS areas. At the start of the method 300, a RSU (e.g., refer to RSU 212 of FIG. 7) transmits a sounding signal 302 to evaluate the environment and, in particular, to interpret the landscape. An exemplary sounding signal is depicted in FIG. 6A, which shows a single beam 214 scanned to cover the entire short-range area 202. The sounding signal reflects off of environmental obstacles to produce a returned multi-dimensional spatial-temporal signal, which provides information regarding the environmental characteristics (e.g., obstacles) that affect the electromagnetic radiation waves of the sounding signal. After the sounding signal is transmitted, a clutter signature 304 is calculated from the returned signal (i.e. the returned sounding signal) to identify objects in the environment, including stationary objects. An example of a clutter signature is illustrated in plot 330 of FIG. 9A. The sounding signal produces a return signal that has different amplitudes at different times. For example, in plot 330 of FIG. 9A, the return signal is shown to have specific amplitudes $A_1$, $A_2$, $A_3$, and $A_4$ returned at different times $t_1$, $t_2$, $t_3$, and $t_4$, respectively. The different amplitudes at different times of the return signal indicate the relation of the positions of objects in the environment. The goal of the method 300 is to understand the environment, and adjust accordingly to detect objects in an NLOS area.

Figure 9B:
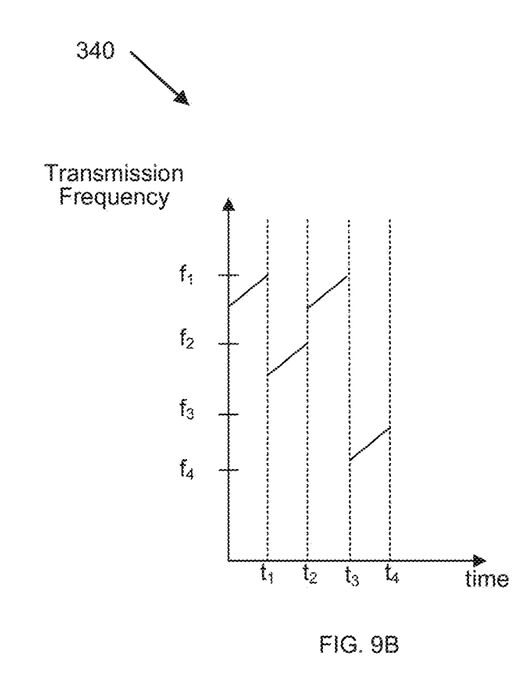
FIG. 9B illustrates a plot of an exemplary transmission frequency hopping signal employed by an object detection system, according to various implementations of the subject technology.

Referring back to FIG. 8, the method 300 is performed by radar within the RSU 212 and, as such, the radar has information regarding the movement of the RSU 212. When the RSU 212 is not moving, 306, the RSU 212 transmits an FMCW signal(s) (e.g., comprising a sawtooth waveform) using frequency-hopping, 308, to detect any interference, as there may be any number of other signals, such as radar signals from other vehicles, that may collide with the radar signals transmitted from the RSU 212. By employing frequency-hopping (i.e. transmitting a signal at a series of different frequencies), the method 300 is able to identify interference at a given frequency and avoid collisions from the resultant interference. Plot 340 of FIG. 9B illustrates an exemplary FMCW signal using frequency hopping. As is shown in plot 340, the FMCW signal is transmitted at different frequencies $f_1$, $f_2$, $f_3$, and $f_4$ with respect to time $t_1$, $t_2$, $t_3$, and $t_4$. In response to the transmission of the FMCW signal(s), the RSU 212 will receive a returned FMCW signal(s). The returned FMCW signal(s) is compared to the transmitted FMCW signal(s) to determine if interference is present.

If no interference is detected, 316, then the RSU 212 may transmit an FMCW signal(s) at a desired frequency. However, if interference is detected, then frequency hopping is turned on for operation of the RSU 212 (i.e. the RSU 212 will transmit an FMCW signal(s) using frequency hopping), 318, to avoid the detected interference. It should be noted that some implementations, the disclosed method 300 may operate to utilize frequency-hopping without determining whether or not interference is present (e.g., omitting step 316 of method 300).

After the FMCW signal(s), with or without frequency-hopping, (i.e. object detection signal(s)) is transmitted by the RSU 212, the RSU 212 will receive a returned FMCW signal(s). Clutter is filtered out of the returned FMCW signal(s), 320, by using the calculated clutter signature to isolate the radar signals of interest. Then, the NLOS motion (e.g., motion of an NLOS object(s)) is extracted, 322, from the filtered FMCW return signal(s).

The filtered returned FMCW signal(s) is processed to determine whether a detected object(s) is located within the LOS area or within an NLOS area. When the round-trip time of the transmitted FMCW signal(s) is greater than a maximum return time delay, it is determined that the object(s) is located within an NLOS area, which is an area located outside of an area (e.g., the LOS area) generated by the radar beams of the RSU 212. And, when the round-trip time of the transmitted FMCW signal(s) is less than or equal to a maximum return time delay, it is determined that the object(s) is located within the LOS area. Once an NLOS object(s) (or an LOS object(s)) is detected, the method 300 compares the filtered returned FMCW signal(s) to the transmitted FMCW signal(s) to calculate the velocity of the object(s) as a function of the frequency difference of the filtered returned FMCW signal(s) and the transmitted FMCW signal(s) and, in some examples, a comparison of the filtered returned FMCW signal(s) to the transmitted FMCW signal(s) is used to obtain a location of the object(s).

Referring back to step 306 of FIG. 8, if the RSU 212 is moving, a clutter delay spread is used to characterize the movement of the RSU 212, and that movement is factored into the returned sounding signal to produce an updated returned sounding signal, 310. An updated clutter signature is then obtained from the updated returned sounding signal. Then, the updated clutter signature is compared to the original clutter signature. If there is a change in the clutter signature (i.e. the updated clutter signature is different than the original clutter signature), 312, the original clutter signature is updated using the updated clutter signature, 314. And, then, the RSU 212 transmits an FMCW signal(s) (e.g., comprising a sawtooth waveform) using frequency-hopping, 308. And the method 300 proceeds as shown. However, when the clutter signature has not changed (i.e. the updated clutter signature is not different than (i.e. very similar to) the original clutter signature), 312, the method 300 proceeds to transmit another sounding signal, 302.

Applying the method 300 of FIG. 8 to the RSU 212 of FIG. 7 illustrates the process. At the start of the method 300, the RSU 212 of FIG. 7 transmits a sounding signal to determine a clutter signature. In this situation, the vehicle 206 is moving and, as such, the RSU 212 is moving. Since the RSU 212 is moving, the clutter delay spread is factored into the motion of the vehicle 206 to maintain an accurate relationship between the vehicle 206 and the clutter (e.g., buildings, such as building 204). If the clutter signature has not changed after factoring in the clutter delay spread, then the RSU 212 will continue to send out a sounding signal. However, if the clutter signature has changed after factoring in the clutter delay spread, the clutter signature is updated based on the current information. The method 300 then determines if there is any interference present, such as from other transmissions from other vehicles within an operational frequency band of the RSU 212. For automotive applications, the range is currently set from 76 gigahertz ("GHz") to 81 GHz, and this is the operational frequency band within which RSU 212 is designed to operate. Alternate systems, and other frequency bands, may be applied to this or other examples. To avoid interference, the RSU 212 transmits a modulated signal, such as an FMCW signal (e.g., an FMCW signal comprising a sawtooth waveform), at different frequencies over time (referred to as frequency hopping). The use of frequency hopping enables the FMCW signal to detect a frequency associated with any interference and, thus, avoid that frequency. If there is no interference detected, the FMCW signal may be transmitted at a default frequency. However, if there is interference detected, the interference may be avoided by continuing the frequency hopping operation of the RSU 212, or by using a specific frequency without interference for the RSU 212 transmission. Clutter is then removed by using the clutter signature to extract the NLOS motion from the FMCW signal and, in some examples, to obtain the location of the object. The time of return of the transmitted FMCW signal indicates if there are multiple hops or deflections, while the frequency change indicates a velocity of the NLOS object with respect to the vehicle 206.

Figure 10:
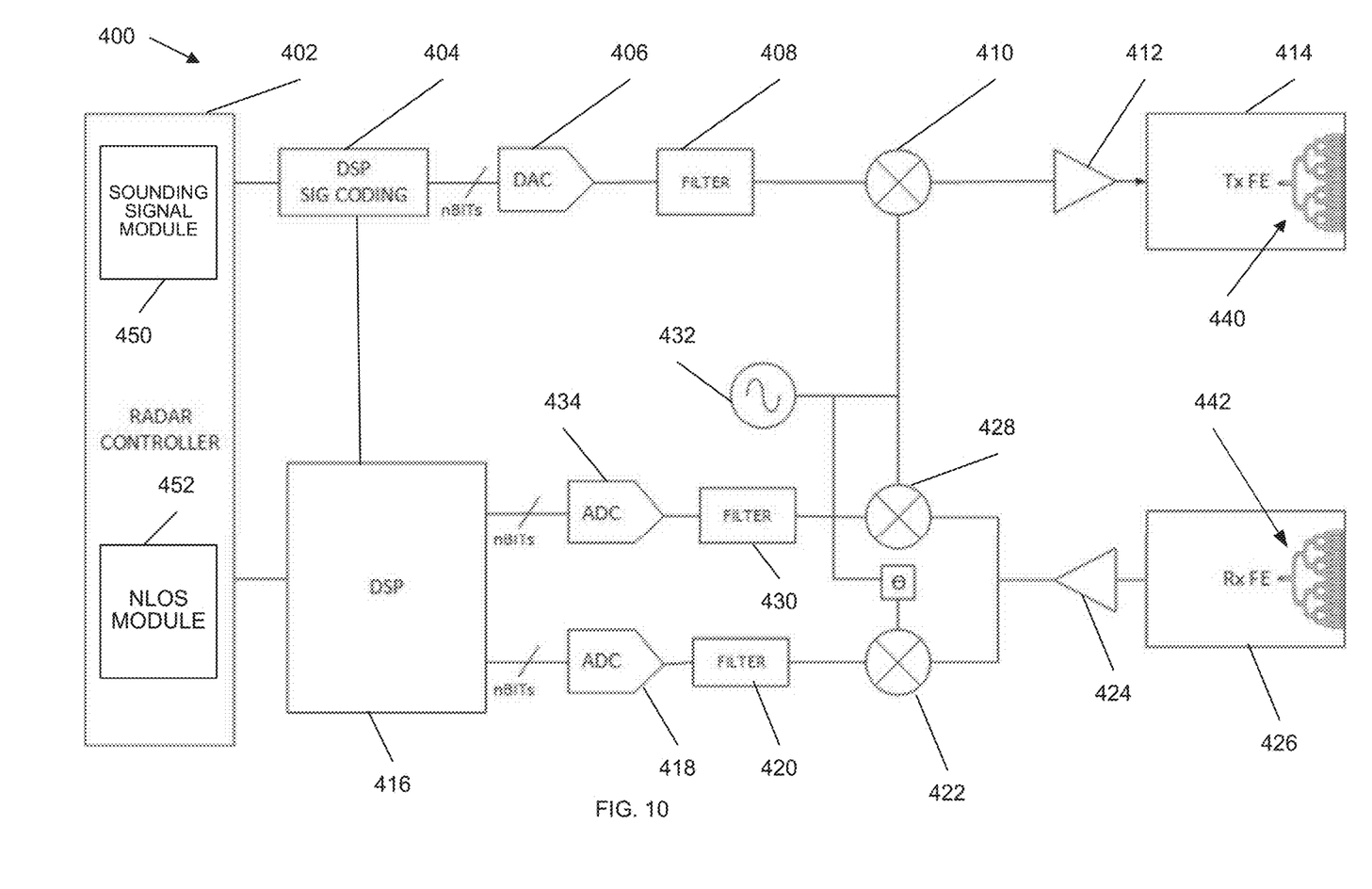
FIG. 10 illustrates a radar sensing unit, according to various implementations of the subject technology.

FIG. 10 illustrates an RSU 400 having transmit and receive antennas, sometimes referred to as a monostatic radar unit. Other units may implement systems that use a single antenna, or set of antennas, for both transmit and receive. The RSU 400 operates to detect range to an object from a pulse delay, velocity of an object from a Doppler frequency shift, as well as angular direction of transmission and arrival of radar and echo, respectively. Each object has a cross-sectional signature determined by the target size, shape, components, movement, material composition, and so forth. Radar controller 402 supervises operation of RSU 400, including generating the digital signal processing ("DSP") signal coding for transmission from DSP unit 404, which is provided to a digital-to-analog converter 406 for transmission from antenna unit 414. The DSP unit 404 provides n number of bits ("nbits") of digital data to a digital-to-analog converter ("DAC") 406, which converts the digital signal to an analog signal. The analog signal is then filtered by filter 408, and the filtered signal is coupled to mixer 410 to be modulated on a carrier signal provided by signal generator 432. In the present examples, the signal generator 432 provides an FMCW modulation scheme, but alternate examples may use other modulation schemes that also enable range-Doppler detection and NLOS detection. The modulated signal is then inputted into a power amplifier 412 for transmission as radiation beams over the air from transmit antenna unit 414. The transmit antenna unit 414 is used to transmit a sounding signal(s) and an object detection signal(s). As illustrated, the transmit antenna unit 414 includes a power distribution and antenna network 440. In the present example, the antenna unit 414 is based on meta-structures to achieve superior performance.

Continuing with RSU 400, mixer 410 is coupled to mixer 428 in the receive chain, which includes receive antenna unit 426 having power distribution and antenna network 442. The receive antenna unit 426 is used to receive a returned sounding signal(s) and a returned object detection signal(s). Received signals are provided to a low noise amplifier ("LNA") 424 that is coupled to mixers 428, 422. The analog signals are then filtered by respective filters 430, 420, and converted by respective analog-to-digital converters ("ADCs") back to digital signals having n bits each, which are then provided to DSP 416.

The radar controller 402 comprises a sounding signal module 450 to generate and transmit a sounding signal, and to evaluate a return sounding signal (e.g., by determining a clutter signature based on the return sounding signal). The return sounding signal is used to identify objects, such as stationary objects, within an environment. The radar controller 402 also includes an NLOS module 452 to identify objects in an NLOS area (or in a LOS area) from radar signals, such as FMCW signals. In particular, the NLOS module 452 is used to generate and transmit an object detection signal(s) (e.g., a FMCW signal(s)), to determine a location (e.g., whether a detected object(s) is located within an NLOS area or LOS area) of a detected object(s) by using a return time of the object detection signal(s), to filter out the clutter signature from a return object detection signal(s) to produce a filtered return object detection signal(s), and to extract motion (and/or obtain the location) of the detected object(s) by using the filtered return object detection signal(s).

Figure 11:
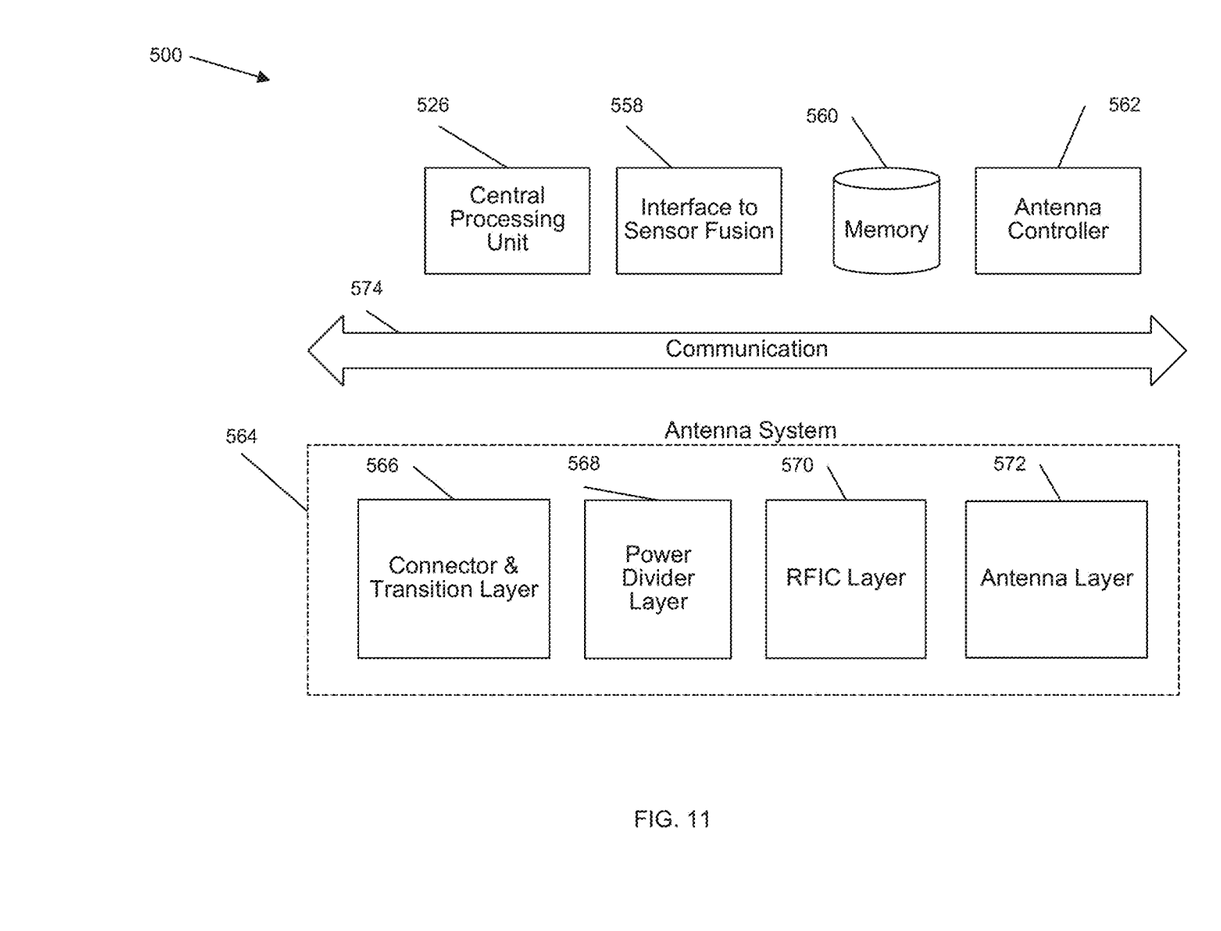
FIG. 11 illustrates a portion of a radar sensing unit, according to various implementations of the subject technology.

A radar unit 500 having antenna system 564 is illustrated in FIG. 11, where the radar unit has a central processing unit 526 that communicates with modules through communication bus 574. The radar unit 500 interfaces to other modules such as to a sensor fusion through an interface to sensor fusion 558. The antenna controller 562 and memory 560 are used to control the antenna system 564. The antenna system 564 comprises a connector and transition layer 566, a power divider layer 568, a radio-frequency integrated-circuit ("RFIC") layer 570, and an antenna layer 572. The antenna system 564 may be configured on substrate having conductive layers and dielectric layers.

In the implementations, examples, scenarios, situations and others, a variety of transmission paths may lead to detection of a target. There are a variety of possible transmission paths, and there may be any number of interactions with obstacles. Where the transmission signal is a FMCW signal, the received signal processing indicates the location of the target by processing time delay, range, and Doppler information relating to velocity. This processing involves time of flight and reflection angles, and extends the detection capability from direct reflections (i.e. radar unit to target and back) to multi-hop transmissions for object detection.

The radar system 500 of FIG. 11 may implement the various aspects, configurations, processes, and modules described throughout this description. The radar system 500 is configured for placement in an autonomous driving system or in another structure in an environment (e.g., buildings, bill boards along roads, road signs, traffic lights, etc.) to complement and supplement information of individual vehicles, devices and so forth. The radar system scans the environment, and may incorporate infrastructure information and data, to alert drivers and vehicles as to conditions in their path or surrounding environment. The radar system is also able to identify targets and actions within the environment. The various examples described herein support autonomous driving with improved sensor performance, all-weather/all-condition detection, advanced decision-making algorithms, and interaction with other sensors through sensor fusion. The radar system leverages intelligent meta-structures and artificial intelligence ("AI") techniques to create a truly intelligent digital eye for autonomous vehicles, which can include Level 1, Level 2, Level 3, Level 4, or Level 5 vehicles, i.e. any vehicle having some capability of autonomous driving, from requiring some driver assistance to full automation.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more steps or less steps of the methods may be performed. Accordingly, examples are intended to exemplify alternatives, modifications, and equivalents that may fall within the scope of the claims.

What is claimed is:

1. A method for object detection, comprising:
   transmitting a sounding signal;
   determining a clutter signature based on the sounding signal;
   transmitting an object detection signal;
   receiving a return object detection signal;
   determining a return time of the object detection signal;
   determining a location of a detected object by using the return time;
   filtering out the clutter signature from the return object detection signal;
   producing a filtered return object detection signal based on the filtering; and
   extracting a motion of the detected object by using the filtered return object detection signal.

2. The method as in claim 1, further comprising:
   receiving a return sounding signal, wherein
   the clutter signature is determined based further on the return sounding signal.

3. The method as in claim 1, wherein the determining of the return time of the object detection signal comprises comparing a time of transmission of the object detection signal to a time of receipt of the return object detection signal.

4. The method as in claim 1, wherein the determining of the location of the detected object comprises identifying the detected object as a non-line of sight object, if the return time exceeds a maximum time threshold.

5. The method as in claim 1, wherein the clutter signature identifies where one or more stationary objects are located.

6. The method as in claim 5, further comprising using a clutter delay spread to update the clutter signature.

7. The method as in claim 1, further comprising detecting interference using frequency hopping.

8. The method as in claim 7, further comprising avoiding the interference using frequency hopping.

9. The method as in claim 1, where the transmitting of the sounding signal comprises scanning a radar beam.

10. The method as in claim 9, wherein the radar beam is scanned over a short-range area, wherein the short-range area is an area covered by the radar beam.

11. The method as in claim 1, wherein the object detection signal comprises a frequency-modulated carrier-wave.

12. The method as in claim 11, wherein the frequency-modulated carrier-wave comprises a sawtooth waveform.

13. The method as in claim 1, wherein the method is performed by a radar sensing unit.

14. The method as in claim 13, wherein the radar sensing unit is employed in a vehicle.

15. A radar sensing unit, comprising:
    a radar controller configured for generating, controlling, and interpreting an object detection signal, the radar controller comprising a sounding signal module and a non-line of sight module, the sounding signal module configured for generating and transmitting a sounding signal to determine a clutter signature;
    a memory configured for storing the clutter signature;
    a transmit antenna unit coupled to the radar controller, adapted to transmit the object detection signal; and
    a receive antenna unit coupled to the radar controller, adapted to receive a return object detection signal,
        wherein the non-line of sight module is coupled to the transmit antenna unit and the receive antenna unit, the non-line of sight module adapted to:
            determine a location of a detected object by using a return time of the object detection signal;
            filter out the clutter signature from the return object detection signal to produce a filtered return object detection signal; and
            extract motion of the detected object by using the filtered return object detection signal.

16. The radar sensing unit as in claim 15, wherein the radar sensing unit is employed in a vehicle.

17. The radar sensing unit as in claim 15, wherein the object detection signal comprises a frequency-modulated carrier-wave.

18. The radar sensing unit as in claim 17, wherein the frequency-modulated carrier-wave comprises a sawtooth waveform.

19. The radar sensing unit as in claim 15, wherein the clutter signature identifies where one or more stationary objects are located.

20. A system for object detection, comprising:
    a transmit antenna configured to transmit a sounding signal and an object detection signal;
    a receive antenna configured to receive a return sounding signal and a return object detection signal;
    a sounding signal module configured to determine a clutter signature based on the return sounding signal; and
    a non-line of sight module configured to determine a return time of the object detection signal, to determine a location of a detected object by using the return time, to filter out the clutter signature from the return object detection signal to produce a filtered return object detection signal, and to extract motion of the detected object by using the filtered return object detection signal.

* * * * *